United States Patent [19]

Brown et al.

[11] Patent Number: 4,938,072
[45] Date of Patent: Jul. 3, 1990

[54] FLOW MEASUREMENT DEVICE

[75] Inventors: Malcolm C. Brown; Paul E. Hammond, both of Merseyside, United Kingdom

[73] Assignee: Masar Limited, West Kirby, England

[21] Appl. No.: 381,664
[22] PCT Filed: Jan. 20, 1988
[86] PCT No.: PCT/GB88/00035
§ 371 Date: Jul. 13, 1989
§ 102(e) Date: Jul. 13, 1989
[87] PCT Pub. No.: WO88/05526
PCT Pub. Date: Jul. 28, 1988
[51] Int. Cl.⁵ ............................................. G01F 1/00
[52] U.S. Cl. ..................................... 73/861; 73/198; 604/246
[58] Field of Search .................. 73/198, 223, 861; 364/510; 604/246

[56] References Cited
U.S. PATENT DOCUMENTS

| | | | |
|---|---|---|---|
| 3,605,741 | 9/1971 | Spencer | 604/246 |
| 3,930,411 | 1/1976 | Beeker et al. | 73/223 |
| 4,409,844 | 10/1983 | Schweiso | 73/861 |
| 4,458,539 | 7/1984 | Bilstad | 73/861 |

FOREIGN PATENT DOCUMENTS 2192294 2/1974 France.
2050626 5/1980 United Kingdom.

Primary Examiner—Herbert Goldstein
Attorney, Agent, or Firm—Scrivener and Clarke

[57] ABSTRACT

A flow measuring device for checking on medical infusion devices comprises a vertical tube 5 having at least three level sensers 10 and 11 for sensing when a liquid reaches the level of each senser. A logic unit 12 containing a timing device triggered by the first senser measures the time taken for the liquid to reach the second senser and the logic unit compares this time with a predetermined time and if the time is less than the predetermined time sets the device to compare a time taken to reach the third senser but if the time is more than the predetermimed time calculates the flow rate. A multi-way valve 1 at the inlet of the device under the control of the logic unit permits flow from the infusion device under test to the tube, from the device under test to a drain 15 or to that drain and the tube, or from the tube to the drain or blocks all flows. The logic unit can sense an excessively rapid flow and treat the flow as a dummy run to be dumped without measurement and summon a subsequent flow to be measured. The tube can be linked to the drain by a pipe 14 so that measurement can take place against a back pressure. A succession of measurements are averaged.

10 Claims, 1 Drawing Sheet

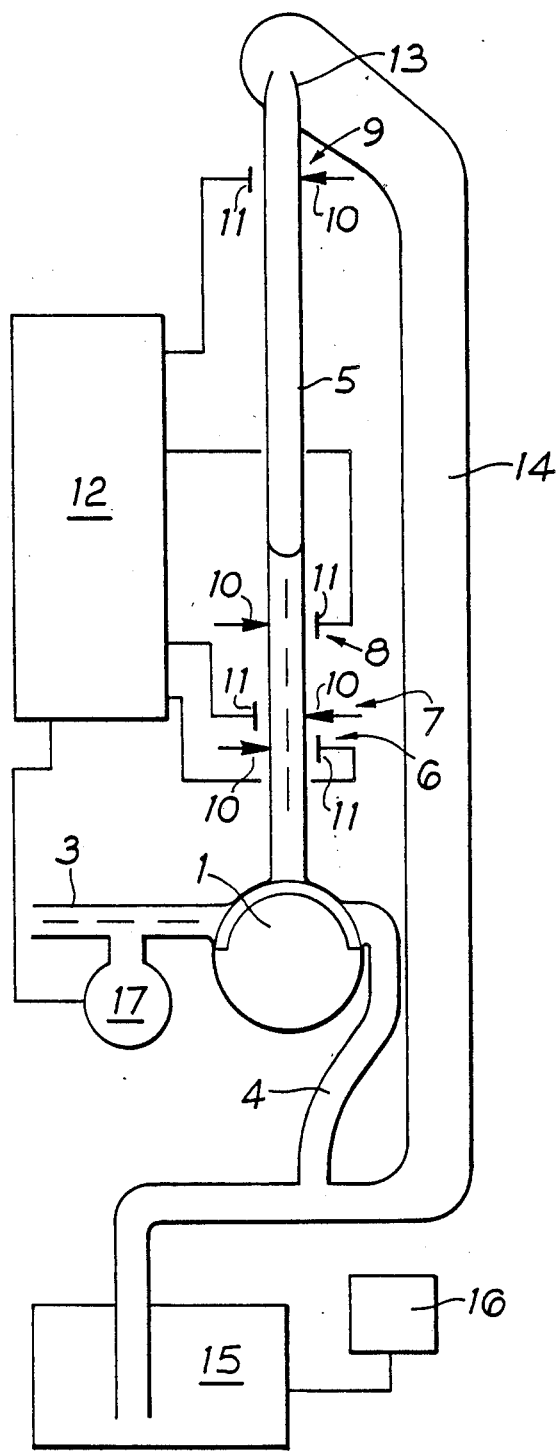

FLOW MEASUREMENT DEVICE

FIELD OF THE INVENTION

The present invention concerns a flow measurement device.

BACKGROUND OF THE INVENTION

There is a frequent need to check on infusion devices as used for a variety of treatments for infusing fluids into medical patients. There are a vast number of infusion devices with the different types giving different rates of flow; the total range needed is from 1 milliliter per hour to 1 liter per hour and in special cases even values outside this range may be called for. One way of measuring flow rates is to have the infusion device pump a liquid into a container or tube and to measure the time difference for the liquid to pass between two sensors; knowing the volume between the two sensors and the time difference, it is easy to calculate the flow rate. However the infusion devices do not have a uniform flow rate due to sanction effects and it is difficult to calculate flow rates over a wide range of flow rates accurately without changing the tube or container. The present invention aims at providing a measuring device with a wide range of measurement without requiring containers or tubes to be replaced to cope with different flow rates.

SUMMARY OF THE PRESENT INVENTION

The present invention provides a flow measurement device having a tube or other container for receiving a flow of a liquid, a plurality of sensors associated with the container to sense when the liquid reaches a level in the container corresponding to each sensor, and a timing device deriving a time difference between sensing of two levels, characterised in that there are more than two sensers and in that logic means associated with the timing device checks whether the time difference exceeds a predetermined minimum and if so calculates the flow rate from that time difference but if not inhibits that calculation and arranges for a time difference derived from a subsequent senser to be used in calculating flow rate.

By having a smaller container than usual, a quicker indication of flow rate can be given at the expense of the indication applying to an instantaneous flow rate (which due to stiction in the infusion device can be erratic). The measuring device can however repeat the measurements rapidly and the logic means derive an averaged measurement so the operator gets an initial quick indication and shortly afterwards an averaged reading getting progressively more reliable. At the same time the device can be smaller and more portable.

The sensors are conveniently optical sensors preferably operating in the infra-red region of the spectrum. The tube or container can be arranged to have increasing cross-sections as by stepping and/or tapering so as to reduce the size of the container.

The measuring device according to the present invention can be used to check on a wide range of types of infusion devices providing infusion rates of 1 to 1000 milliliters per hour and possibly even rates outside those figures without any need for changing the tube or container which changing might introduce calibration errors and might introduce an error due to leakage or the introduction of air bubbles at remakeable seals.

The measuring device can be used to measure the effect of back pressure by using a suitable pressure regulator on the outlet of the device. It is possible to arrange the device with a closed liquid system so the entire system can be pressurised with that system being connected by a drain connection to a sump.

BRIEF DESCRIPTION OF THE DRAWING

The drawing is a schematic section of a flow measuring device according to the present invention.

DESCRIPTION OF AN EXEMPLARY EMBODIMENT

The flow measuring device illustrated comprises a valve 1 having an inlet connection 3 and an exhaust or drain connection 4. Upstanding from the valve, there is a transparent or translucent tube 5 along the side of which in staggered relationship there is a succession of sensors 6, 7, 8 and 9, the spacings between which increase progressively say in a geometric ratio of three to one. Each sensor comprises a light emitting diode 10 and a photo-sensing cell 11. The cells' outputs are connected to a timing and logic unit 12. The top end of the tube 5 is formed as a converging nozzle 13 and enters a wide bore tube 14. The nozzle breaks up the size of liquid leaving the top of the tube 5 and the tube 14 has an internal diameter large enough, say 8 millimeters, for the liquid discharged from the nozzle not to be able to bridge that tube but to run down the tube eliminating any risk that a mixture of air and liquid may be sucked back into the tube 5. The tube 14 leads to a closed sump 15 and is connected to the exhaust connection. The sump has associated with it a pressure regulator 16 which can set the pressure in and throughout the closed system of the measuring device to an above or below atmospheric pressure. The tube 5 and the valve 1 should permit the liquid to be exhausted from the tube 5 at a faster rate than the tube filled. It is to be noted that when the liquid is exhausted from the tube 5, the closed nature of the liquid system tends to retain the liquid so it does not enter the sump unless fresh liquid is being introduced into the system but lodges in a U-tube arrangement formed by the exhaust connection and the tube 14; this U-tube arrangement should have a geometry such that with the contents of the entire tube 5 in it there is still some distance between the liquid level in the tube 14 and the valve irrespective of back-pressure which can exceed 300 mm. Hg. This U-tube arrangement will discharge into the sump an amount equal to the volume introduced into the tube 5 so that the levels in the U-tube arrangement stay substantially constant.

A pressure transducer 17 in the inlet connection 3 can be used with the valve closing off the inlet connection to sense the pressure generated by the infusion device to demonstrate the occlusion, stall and/or alarm pressure of the infusion device.

The valve 1 is operable by the logic unit 12 between conditions allowing flow from the inlet connection to the tube 5 with the drain connection blocked, from the inlet connection to both tube 5 and drain connection, and from nowhere to nowhere with an optional further condition blocking off the inlet connection but allowing the tube to drain to the drain connection. Changeover between conditions should be rapid. The valve can be of the rotary type as illustrated, of the shuttle type, of the solenoid type or any other suitable type. The logic unit comprises a timing or clock circuit which is triggered by a first signal from a cell 11. A second signal from a second cell 11 establishes a time difference which can be checked to ensure that it is larger than a minimum acceptable time interval and then the time difference used to calculate the flow rate. If the signal from the second cell arrives too fast the logic unit tells itself to look for a third signal from a third cell and to alter the volume in the flow rate calculation. If the third signal is too fast, then the logic unit looks for a fourth signal and so on except the signal from the last cell has to be used or be used to give an alarm. When or as the flow rate is calculated, the logic unit energises the valve 1 causing the liquid to be dumped. When the first sensor or a sensor especially for the purpose gives a signal denoting the liquid has fallen sufficiently or possibly after a suitable time delay, the logic unit allows the valve to permit a second measurement to be made. The volumes and times involved in various readings are summed and an average flow rate derived. The inlet tube should not be allowed to remain blocked too long or there may be a surge of liquid when flow starts again. The problem of an opening surge if one occurs can be overcome in many ways. The logic unit can sense an excessively rapid flow and operate not on the first signal and a subsequent signal but on the second or third signals and a later signal. The logic unit on sensing an excessively rapid flow can treat it as a dummy run not to be measured but to be terminated quickly so the surge is dumped with an actual measurement taking place quickly so there would be no or little surge on an actual measurement. However this problem is largely avoided by arranging the valve so that the contents of the tube 5 is dumped whilst the valve permits the infusion device to continue pumping direct to the drain connection. During a succession of measurements, the tube 5 should not be allowed to empty entirely for any air in the valve could cause air bubbles which would give false readings. The presence of bubbles in the liquid can be detected by the logic unit for if the cells claim when the valve is set for the tube 5 to fill to see liquid followed by no liquid this would be a clear indication that a bubble is present. The logic unit can then either dump the liquid or arrange for the bubble and any subsequent bubble to be pumped out through the nozzle 13.

We claim:

1. A flow measurement device having a tube or other container for receiving a flow of a liquid, a plurality of sensors associated with the container to sense when the liquid reaches a level in the container corresponding to each sensor, and a timing device deriving a time difference between sensing of two levels, characterised in that there are more than two sensors and in that logic means associated with the timing device checks whether the time difference exceeds a predetermined minimum and if so calculates the flow rate from that time difference but if not inhibits that calculation and arranges for a time difference derived from a subsequent sensor to be used in calculating flow rate.

2. A flow measuring device according to claim 1 wherein a valve at an inlet to be connected to the flow being measured is such as to block the flow, to direct flow to a drain connection, to direct flow to the container with the drain connection blocked, or to direct flow to both drain connection and to the container, the valve being under the control of the logic means.

3. A flow measuring device according to claim 2 wherein the valve also permits flow from the container to the drain connection with the flow being measured blocked.

4. A flow measuring device according to claim 3 wherein if a time difference less than a second predetermined minimum is sensed, the logic means operates the valve to dump the contents of the container into the drain connection.

5. A flow measuring device according to claim 3 wherein when the flow is into the container and a senser detects a change from liquid to non-liquid, the logic means causes the condition to be cleared before allowing a measurement to be taken.

6. A flow measuring device according to claim 2 wherein when the logic means signals that a measurement has been taken, the logic means causes the contents of the container to be dumped and after a delay or a signal from a bottom sensor denoting that the liquid level has fallen below that bottom sensor causes the flow to the container to be restored for a subsequent measurement, various measurement being averaged and displayed.

7. A flow measuring device according to claim 2 wherein the drain connection leads to a sump which can be pressurised to a desired positive or negative pressure and wherein a pressure balancing tube connects the container at its top to the drain connection.

8. A flow measuring device according to claim 7 wherein the container connects into the balancing tube through a nozzle and the balancing tube has a diameter large enough to prevent liquid bridging across it and so forming bubbles.

9. A flow measuring device according to claim 7 wherein the balancing tube is connected to the drain connection in such a way as to form a U-bend which has a volume such that there is some distance between the valve and the level in the U-bend.

10. A flow measuring device according to claim 2 wherein a pressure measuring device is provided upstream of the valve so that with the valve blocking flow, the occlusion, stall and/or alarm pressures generated by the source of the liquid can be measured.

* * * * *